US011428252B2

(12) United States Patent
Buls et al.

(10) Patent No.: US 11,428,252 B2
(45) Date of Patent: Aug. 30, 2022

(54) SYSTEM AND METHODS FOR BONDING A STRUCTURAL COMPONENT WITHIN A CHANNEL OF A RAIL

(71) Applicant: The Boeing Company, Chicago, IL (US)

(72) Inventors: Daniel L. Buls, Chicago, IL (US); Thomas N. Burlis, Chicago, IL (US); Christopher A. White, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/308,446

(22) Filed: May 5, 2021

(65) Prior Publication Data

US 2021/0254646 A1 Aug. 19, 2021

Related U.S. Application Data

(62) Division of application No. 16/039,915, filed on Jul. 19, 2018, now Pat. No. 11,041,518.

(51) Int. Cl.
*B64F 5/10* (2017.01)
*F16B 11/00* (2006.01)
(Continued)

(52) U.S. Cl.
CPC .......... *F16B 11/006* (2013.01); *B64C 1/1476* (2013.01); *B64F 5/10* (2017.01); *F16B 19/02* (2013.01); *B29C 65/542* (2013.01)

(58) Field of Classification Search
CPC ...... F16B 11/006; F16B 19/02; B64C 1/1476; B29C 65/542
See application file for complete search history.

(56) References Cited

U.S. PATENT DOCUMENTS

2006/0113451 A1 6/2006 Kilwin et al.

FOREIGN PATENT DOCUMENTS

| EP | 2 974 334 | 11/2015 |
| GB | 574 055 | 12/1945 |

(Continued)

OTHER PUBLICATIONS

Extended European Search Report prepared by the European Patent Office in Application No. EP 19 17 3762.6 dated Nov. 29, 2019.

*Primary Examiner* — Jeffry H Aftergut
*Assistant Examiner* — Jaeyun Lee
(74) *Attorney, Agent, or Firm* — McDonnell Boehnen Hulbert & Berghoff LLP

(57) ABSTRACT

The present disclosure provides a system for an aircraft. The system includes a rail having a bottom surface, and a first and a second sidewall extending from the bottom surface. The first sidewall, the second sidewall, and the bottom surface define a channel. The rail also includes blind holes, located in the bottom surface. The system also includes spacers, each comprising a stem and a top portion, extending substantially perpendicular to the stem. The stem of each of the spacers is configured to be positioned in a respective one of the blind holes such that a longitudinal axis of the top portion of each of the spacers is parallel to a longitudinal axis of the channel. The system also includes a structural component, a portion of which is configured to be positioned into the channel such that the structural component rests on the top portion of each of the spacers.

20 Claims, 11 Drawing Sheets

(51) Int. Cl.
*B64C 1/14* (2006.01)
*F16B 19/02* (2006.01)
*B29C 65/54* (2006.01)

(56) References Cited

FOREIGN PATENT DOCUMENTS

| GB | 2 434 187 | 7/2007 |
|---|---|---|
| WO | WO 2006/060321 | 6/2006 |

SYSTEM AND METHODS FOR BONDING A STRUCTURAL COMPONENT WITHIN A CHANNEL OF A RAIL

CROSS REFERENCE TO RELATED APPLICATION

The present application claims priority to and is a divisional of U.S. patent application Ser. No. 16/039,915, filed on Jul. 19, 2018, the entirety of which is herein incorporated by reference.

FIELD

The present disclosure relates generally to bonding systems, and more particularly, to systems and methods for bonding a structural component within a channel of a rail.

BACKGROUND

Traditionally, joining an aircraft canopy to a canopy rail involves drilling holes in both the aircraft canopy and the canopy rail, and attaching nuts, bolts, and sealers through those drilled holes to thereby secure the aircraft canopy to the canopy rail. Such a process may be time consuming, and may result in an assembly with discontinuous forces applied to the canopy assembly. To address these potential concerns, a bonding agent may be used to bond the canopy to the canopy rail in place of nuts and bolts. However, such an approach may be complicated by the fact that the bonding agent requires a minimum gap between the aircraft canopy and the sidewalls and bottom surface of the canopy rail to allow the bonding agent to flow around and adhere to the aircraft canopy positioned in the canopy rail.

SUMMARY

In one aspect, a method for bonding a structural component to a rail, the rail including a bottom surface, a first sidewall extending from the bottom surface, and a second sidewall extending from the bottom surface to thereby define a channel is described. The method includes (a) positioning a bonding agent in a plurality of blind holes defined in the bottom surface of the rail, (b) positioning a spacer in each of the plurality of blind holes, wherein each spacer has a stem and a top portion extending substantially perpendicular to the stem, and wherein the stem of the spacer is positioned in each of the plurality of blind holes such that a longitudinal axis of the top portion of each spacer is parallel to a longitudinal axis of the channel, (c) positioning the structural component at least partially into the channel such that the structural component rests on each spacer, wherein a first gap is defined between the structural component and the bottom surface of the rail, wherein a second gap is defined between the structural component and the first sidewall of the rail, and wherein a third gap is defined between the structural component and the second sidewall of the rail, and (d) injecting the bonding agent into the channel such that each of the first gap, the second gap, and the third gap includes the bonding agent to thereby bond the structural component to the rail.

In another aspect, a system for bonding a structural component to a rail is described. The system includes (a) a rail including a bottom surface, a first sidewall extending from the bottom surface, and a second sidewall extending from the bottom surface to thereby define a channel, wherein the rail further includes a plurality of blind holes defined in the bottom surface, (b) a plurality of spacers each including a stem and a top portion extending substantially perpendicular to the stem, and wherein the stem of a given spacer of the plurality of spacers is configured to be positioned in each of the plurality of blind holes such that a longitudinal axis of the top portion of each spacer is parallel to a longitudinal axis of the channel, and (c) a structural component configured to be positioned at least partially into the channel such that the structural component rests on the top portion of the plurality of spacers.

In yet another aspect, another method for bonding a structural component to a rail, the rail including a bottom surface, a first sidewall extending from the bottom surface, and a second sidewall extending from the bottom surface to thereby define a channel is described. The method includes (a) positioning a bonding agent in a plurality of blind holes defined in the bottom surface of the rail, (b) positioning a spacer in each of the plurality of blind holes, wherein each spacer has a stem and a top portion extending substantially perpendicular to the stem, and wherein the stem of the spacer is positioned in each of the plurality of blind holes such that a longitudinal axis of the top portion of each spacer is parallel to a longitudinal axis of the channel, (c) positioning the structural component at least partially into the channel such that the structural component rests on each spacer, wherein a first gap is defined between the structural component and the bottom surface of the rail, wherein a second gap is defined between the structural component and the first sidewall of the rail, and wherein a third gap is defined between the structural component and the second sidewall of the rail, (d) positioning a first plurality of removable spacers between the first sidewall of the rail and the structural component, (e) positioning a second plurality of removable spacers between the second sidewall of the rail and the structural component, (f) sealing an upper edge of the first sidewall of the rail to the structural component while simultaneously removing the first plurality of removable spacers, (g) sealing an upper edge of the second sidewall of the rail to the structural component while simultaneously removing the second plurality of removable spacers, (h) injecting the bonding agent into a first through hole of a plurality of through holes in the bottom surface of the rail such that the bonding agent exits an adjacent through hole of the plurality of through holes, (i) sealing the first through hole, (j) repeating the previous two steps such that each of the plurality of through holes have been injected with the bonding agent and each of the first gap, the second gap, and the third gap includes the bonding agent to thereby bond the structural component to the rail.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

DETAILED DESCRIPTION

The examples described herein provide an improved spacer and corresponding method of use when bonding a structural component (e.g., aircraft canopy) to a corresponding structural channel (e.g., canopy rail). Within examples, a system for bonding a structural component to a rail is described herein. More specifically, as described herein, joining a structural component to a rail using a bonding compound can assure an airtight seal and uniform distribution of loads and stresses along that fitting.

Accordingly, the improved system described herein can enable joining of a structural component to a corresponding rail using a bonding component while assuring that the structural component seats into the rail with uniform predetermined fit and structural integrity. In particular, the system described herein includes a plurality of spacers each including a stem and a top portion extending substantially perpendicular to the stem. The stem of a given spacer of the plurality of spacers is configured to be positioned in each of a plurality of blind holes in a bottom surface of the rail such that a longitudinal axis of the top portion of each spacer is parallel to a longitudinal axis of a channel of the rail. The structural component is configured to be positioned at least partially into the channel such that the structural component rests on the top portion of the plurality of spacers. When the structural component is positioned on the top portion of the plurality of spacers, a first gap is defined between the structural component and the bottom surface of the rail, a second gap is defined between the structural component and a first sidewall of the rail, and a third gap is defined between the structural component and a second sidewall of the rail.

Various other features of the example systems discussed above, as well as methods for using these systems, are also described hereinafter with reference to the accompanying figures. Illustrative, non-exhaustive examples, which may or may not be claimed, of the subject matter according the present disclosure are provided below.

Figure 1:
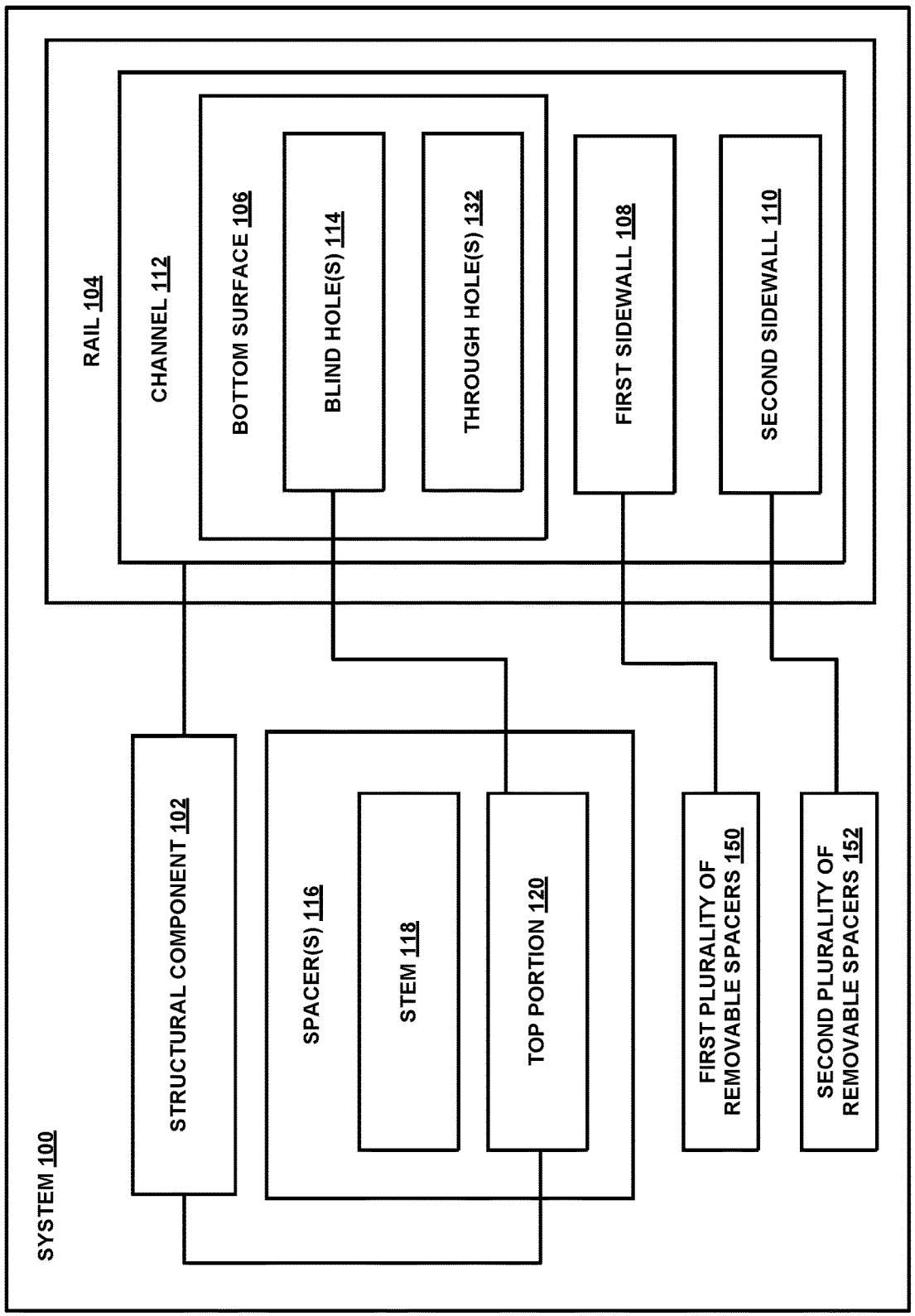
FIG. 1 is a block diagram of an example system.

With reference to the Figures, FIG. 1 illustrates an example system 100 for bonding a structural component 102 to a rail 104. As shown in FIG. 1, the system 100 includes a rail 104 including a bottom surface 106, a first sidewall 108 extending from the bottom surface 106, and a second sidewall 110 extending from the bottom surface 106 to thereby define a channel 112. The rail 104 further includes a plurality of blind holes 114 defined in the bottom surface 106. The system 100 also includes a plurality of spacers 116 each including a stem 118 and a top portion 120 extending substantially perpendicular to the stem 118. The stem 118 of a given spacer of the plurality of spacers 116 is configured to be positioned in each of the plurality of blind holes 114 such that a longitudinal axis of the top portion 120 of each spacer 116 is parallel to a longitudinal axis of the channel 112. In one example, each of the plurality of spacers 116 are a different color than the rail 104 such that the plurality of spacers 116 are easily distinguishable from the rail 104. The system 100 also includes a structural component 102 configured to be positioned at least partially into the channel 112 until the structural component 102 rests on the top portion 120 of the plurality of spacers 116.

The plurality of spacers 116 may be made of a material and a thickness that will bear the weight transferred from the structural component 102 to the rail 104. In one example, each of the plurality of spacers 116 comprises a first material, and the structural component 102 comprises a second material that is different than the first material. In one example, the first material is softer than the second material. As used herein, the "softness" of the first material and the second material may be defined by a hardness scale value (e.g., Rockwell or Shore hardness), a Vickers hardness value, a compression, a durability, or a plastic deformation. Such an arrangement may help prevent damage to the structural component 102 when it is positioned on the plurality of spacers 116. However, the first material should be sufficiently strong to avoid noticeable deformation under the weight of the structural component 102. The first material of the plurality of spacers 116 may include any material that is compatible with the rail 104, the structural component 102, and the bonding agent 103 used to secure the structural component 102 to the rail 104.

The vertical height of the top of each of the plurality of spacers 116 determines the space between the bottom surface 106 of the rail 104 and the bottom of the structural component 102. Such a vertical height may be selected based on the particular structural component 102 and particular rail 104 into which the structural component 102 is positioned.

Figure 2B:
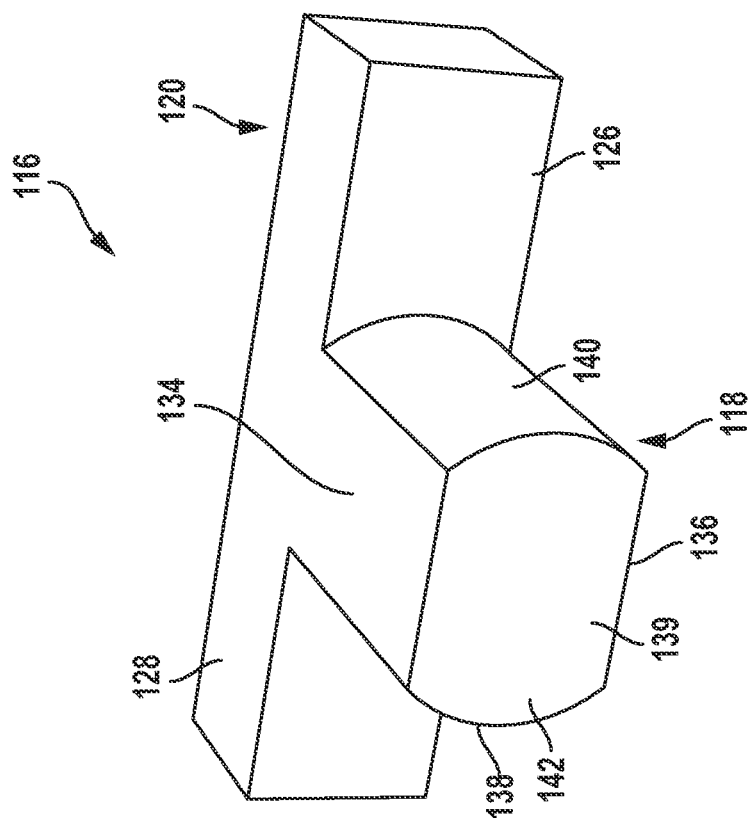
FIG. 2B is a bottom perspective view of the spacer of FIG. 2A.
Figure 2A:
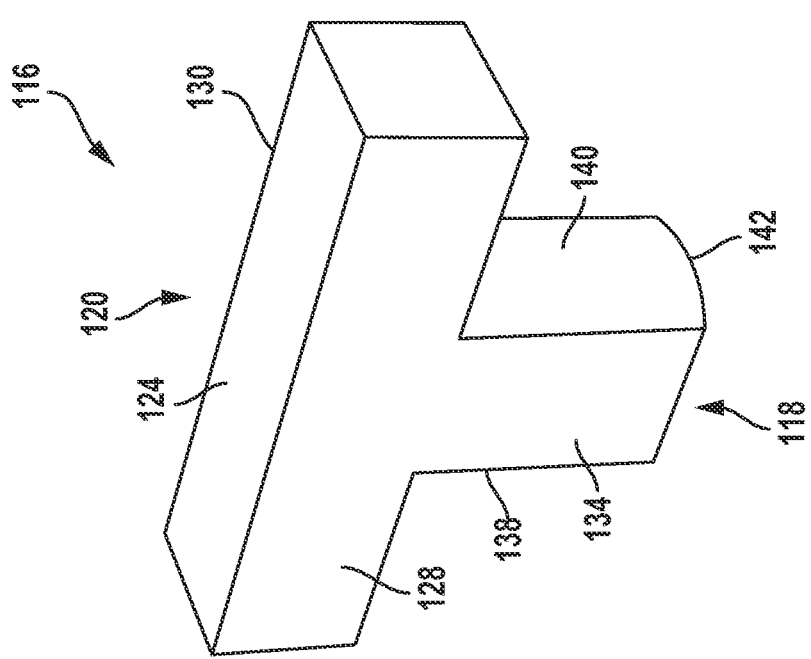
FIG. 2A is a perspective view of an example spacer that can be used in the system shown in FIG. 1.

The top portion 120 of each of the plurality of spacers 116 includes a top surface 124, a bottom surface 126 opposite the top surface 124, a first side surface 128, and a second side surface 130 opposite the first side surface 128. In one example, as shown in FIGS. 2A-2B, each of the top surface 124, the bottom surface 126, the first side surface 128, and the second side surface 130 are substantially flat. The substantially flat top surface 124 helps to ensure a solid fit with the structural component 102, while the substantially flat bottom surface 126 helps to ensure a snug fit with the bottom surface 106 of the rail 104. The first side surface 128 and second side surface 130 may be substantially flat to ensure that the bonding agent 103 can flow around the top surface 124 of the spacer 116, as discussed in additional detail below with respect to FIGS. 4 and 5.

Figure 3A:
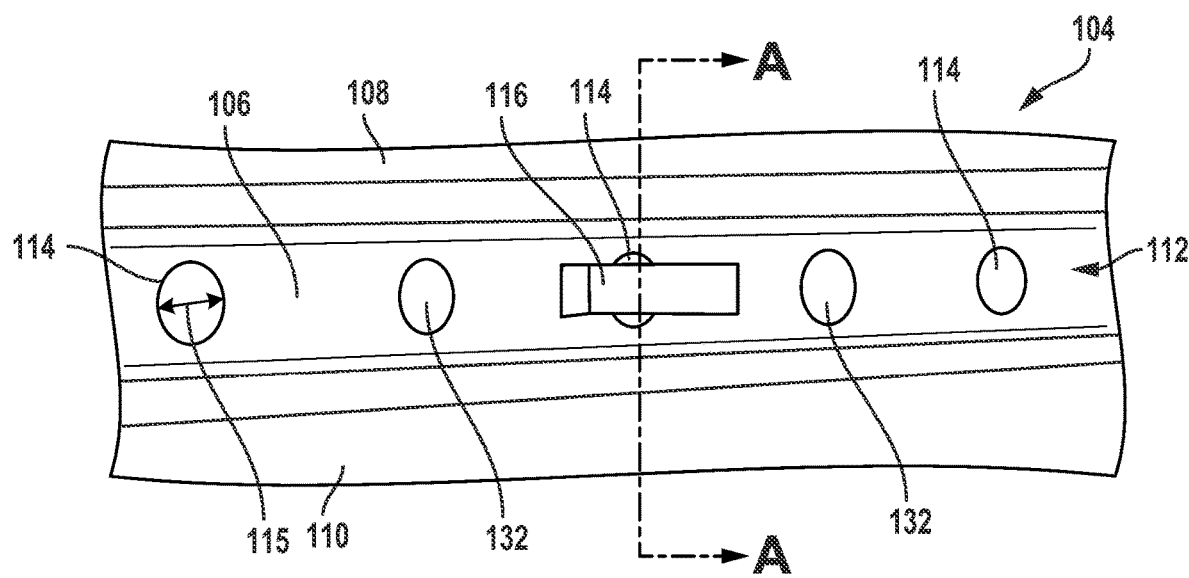
FIG. 3A is perspective view of an example spacer positioned in a channel of a rail in the system of FIG. 1.
Figure 3B:
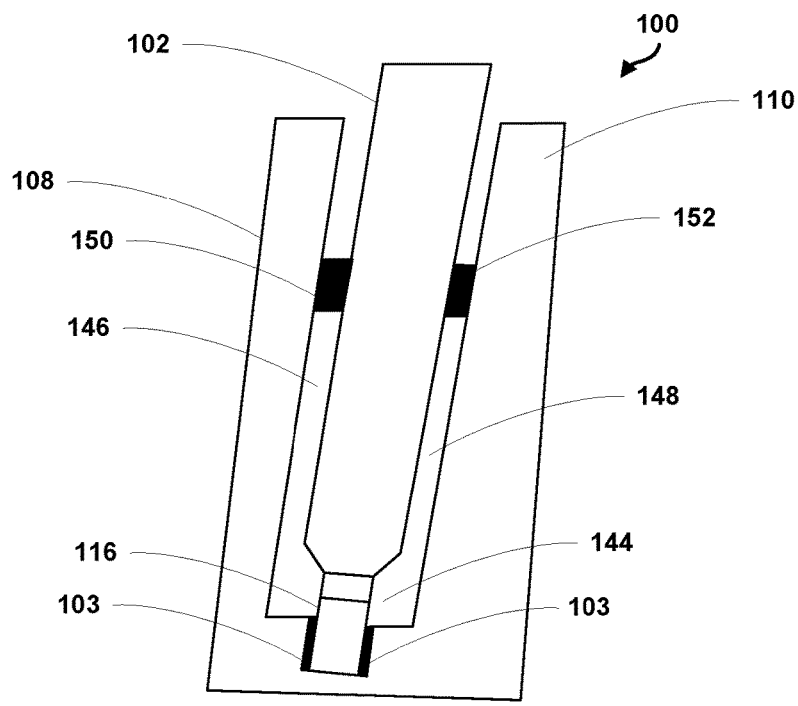
FIG. 3B is a section A-A cross-section view of the spacer and rail of FIG. 3A with a structural component positioned in the channel of the rail.

In one example, the bottom surface 106 of the rail 104 further includes a plurality of through holes 132 interspaced between the plurality of blind holes 114 on the bottom surface 106 of the rail 104, as shown in FIG. 3A. As used herein, "interspaced" means occupying a space between two things. For example, the plurality of through holes 132 are interspaced between the plurality of blind holes 114 on the bottom surface 106 of the rail 104 such that the bottom surface 106 alternates between a though hole 132 and a blind hole 114. The plurality of blind holes 114 and plurality of though holes 132 may be evenly interspaced, or may be unevenly interspaced such that there is a different distance between adjacent holes. The plurality of through holes 132 provide a location into which the bonding agent 103 can be injected, as discussed in addition detail below with respect to FIGS. 4 and 5.

The stem 118 of each of the plurality of spacers 116 may include a first side 134, a second side 136 opposite the first side 134, a third side 138, a fourth side 140 opposite the third side 138, and a bottom side 139. The bottom side 139 may be substantially flat such that it sits flat on the bottom surface of the blind hole 114. In one example, the first side 134 and the second side 136 are substantially flat and are parallel to the longitudinal axis of the channel 112, and the third side 138 and the fourth side 140 have a radius of curvature 142 corresponding to a diameter 115 of each of the plurality of blind holes 114. In such an example, the rounded third side 138 and fourth side 140 of the stem 118 of each of the plurality of spacers 116 has a light to no interference fit into each of the plurality of blind holes 114. In one example, the stem 118 of each of the plurality of spacers 116 is press fit into each of the plurality of blind holes 114. In another example, a bonding agent 103 is positioned into each of the plurality of blind holes 114 before inserting the stem 118 of each of the plurality of spacers 116. In such an example, the substantially flat first side 134 and second side 136 can enable excess bonding agent 103 to exit the plurality of blind holes when the stem 118 is inserted therein. Further, the substantially flat first side 134 and second side 136 can enable the bonding agent 103 to flow into the plurality of blind holes 114, further assuring the quality of the bond between the structural component 102 and the rail 104.

The distance between the first side surface 128 and the second side surface 130 of the top portion 120 of each of the plurality of spacers 116 may be equal to the distance between the first side 134 and the second side 136 of the stem 118 of each of the plurality of spacers 116. Such an arrangement may help ensure that the bonding agent 103 can flow both around the top portion 120 of each of the plurality of spacers 116 as well as into each of the plurality of blind holes 114 in the bottom surface 106 of the rail 104.

The plurality of blind holes 114 are drilled with predetermined spacing such that when the plurality of spacers 116 are positioned in the corresponding plurality of blind holes 114, the plurality of spacers 116 satisfy fit and load bearing requirements to support the structural component 102 positioned thereon. When the structural component 102 is positioned on the top portion 120 of the plurality of spacers 116, a first gap 144 is defined between the structural component 102 and the bottom surface 106 of the rail 104, a second gap 146 is defined between the structural component 102 and a first sidewall 108 of the rail 104, and a third gap 148 is defined between the structural component 102 and a second sidewall 110 of the rail 104. The various gap sizes may be determined based on the width of the distance between the first sidewall 108 and the second sidewall 110, the width of the structural component 102, and the viscosity of the bonding agent 103 used to bond the structural component 102 to the rail 104.

In one example, the system 100 further includes a first plurality of removable spacers 150 configured to be removably positioned between the first sidewall 108 of the rail 104 and the structural component 102. The system 100 may further include a second plurality of removable spacers 152 configured to be removably positioned between the second sidewall 110 of the rail 104 and the structural component 102. The first plurality of removable spacers 150 and the second plurality of removable spacers 152 may help center the structural component 102 between the first sidewall 108 and the second sidewall 110 of the rail 104 before the bonding agent 103 is injected into the channel 112. As the bonding agent 103 is injected into the channel 112, the first plurality of removable spacers 150 and the second plurality of removable spacers 152 may be removed.

In one particular example, the structural component 102 comprises an aircraft canopy, and the rail 104 comprises a canopy rail. However, the use of the system 100 described above is not limited to aircraft canopies. Instead, the system 100 described above can be used in any circumstance where it is necessary to bond a structural component to and within a channel defined by a rail having a bottom surface and two opposing sidewalls.

Figure 4A:
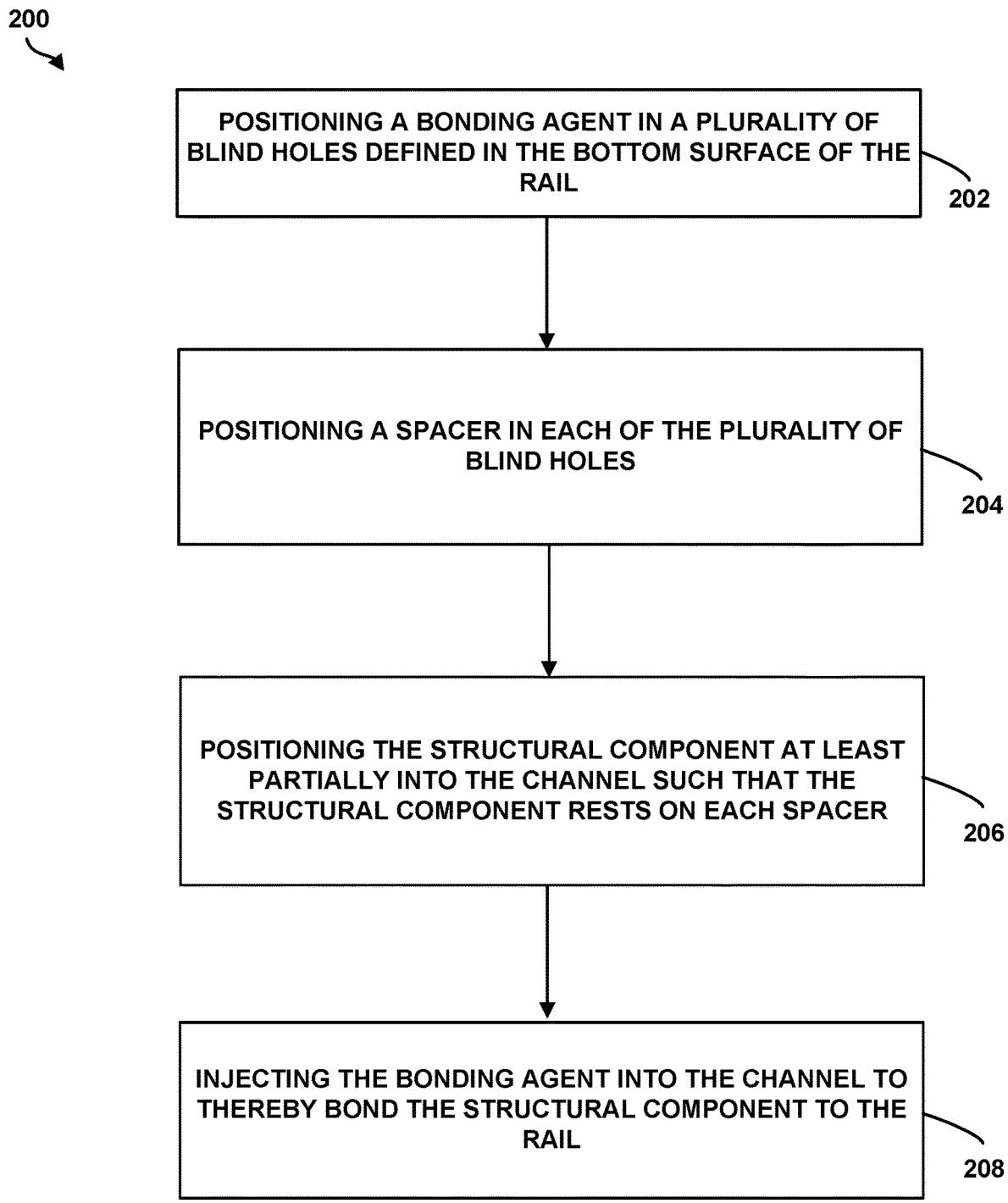
FIG. 4A is a flowchart of an example method for bonding a structural component to a rail using the system of FIGS. 1 to 3B.

FIG. 4A is a block diagram of an example method for bonding a structural component 102 to a rail 104. As discussed above, the rail 104 includes a bottom surface 106, a first sidewall 108 extending from the bottom surface 106, and a second sidewall 110 extending from the bottom surface 106 to thereby define a channel 112. Method 200 shown in FIG. 4A presents an example of a method that could be used to assemble the system 100 discussed above in relation to FIGS. 1-3B, as an example. Method 200 includes one or more operations, functions, or actions as illustrated by one or more of blocks 202-208. In one example, an aircraft component supplier can manufacture or deliver the structural component 102 and/or the rail 104 to an end user such as an aircraft manufacturer. The aircraft manufacturer could then perform the actions recited in blocks 202-208 below. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 202, the method 200 includes positioning a bonding agent 103 in a plurality of blind holes 114 defined in the bottom surface 106 of the rail 104. The bonding agent 103 may be selected based on the particular structural component 102 that will be bonded to a particular rail 104. At block 204, the method 200 includes positioning a spacer 116 in each of the plurality of blind holes 114. As discussed above, each spacer 116 has a stem 118 and a top portion 120 extending substantially perpendicular to the stem 118 to form a t-shape. The stem 118 of the spacer 116 is positioned in each of the plurality of blind holes 114 such that a longitudinal axis of the top portion 120 of each spacer 116 is parallel to a longitudinal axis of the channel 112. In one example, positioning a spacer 116 in each of the plurality of blind holes 114 comprises positioning each spacer 116 such that the longitudinal axis of the top portion 120 of each spacer 116 is positioned in a flow direction of the bonding agent 103 when the bonding agent 103 is injected into the channel 112. As such, each spacer 116 is aligned with the injection flow path of the bonding agent 103 to thereby reduce the impact the spacer 116 has on the flow of the bonding agent 103.

At block 206, the method 200 includes positioning the structural component 102 at least partially into the channel 112 such that the structural component 102 rests on each spacer 116. As discussed above, a first gap 144 is defined between the structural component 102 and the bottom surface 106 of the rail 104, a second gap 146 is defined between the structural component 102 and the first sidewall 108 of the rail 104, and a third gap 148 is defined between the structural component 102 and the second sidewall 110 of the rail 104.

At block 208, the method 200 includes injecting the bonding agent 103 into the channel 112 such that each of the first gap 144, the second gap 146, and the third gap 148 includes the bonding agent 103 to thereby bond the structural component 102 to the rail 104. In particular, the bonding agent 103 cures for a time period to ensure that the structural component 102 is permanently bonded to the rail 104.

Figure 4B:
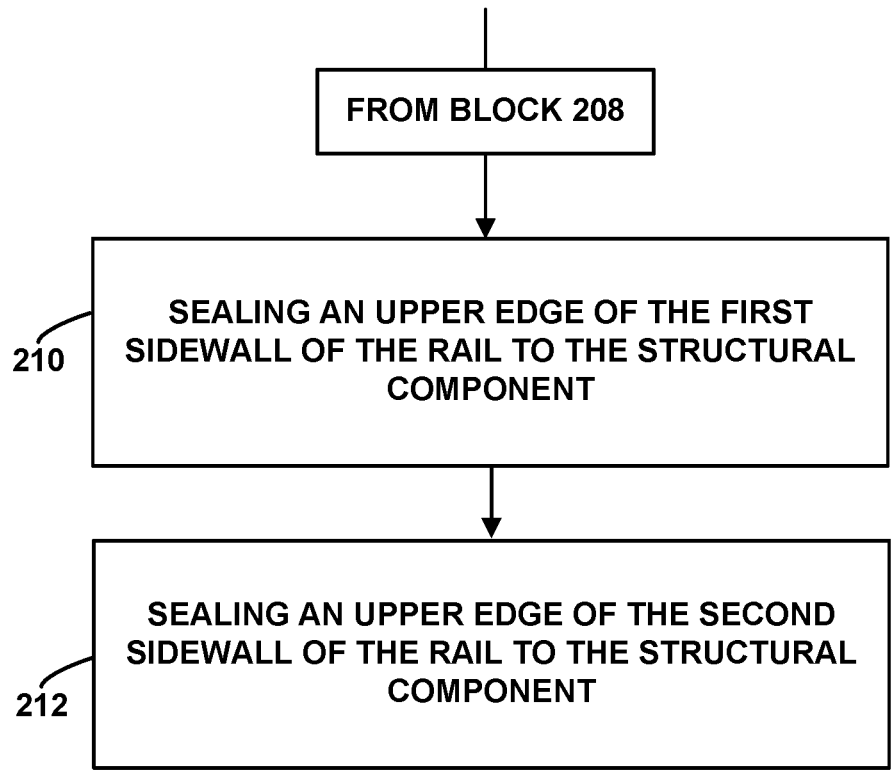
FIG. 4B is a flowchart of a method, which is a continuation of the method for bonding a structural component to a rail using the systems of FIGS. 1 to 3B shown in FIG. 4A.

In one example, as shown in FIG. 4B, at block 210 the method 200 further includes sealing an upper edge of the first sidewall 108 of the rail 104 to the structural component 102. At block 212, the method 200 further includes sealing an upper edge of the second sidewall 110 of the rail 104 to the structural component 102. In one particular example, sealing the upper edge of the first sidewall 108 of the rail 104 and the structural component 102 comprises applying a first fillet seal, and sealing the upper edge of the second sidewall 110 of the rail 104 and the structural component 102 comprises applying a second fillet seal. As used herein, applying a seal may involve the steps of applying a sealant to a surface and shaping at least a portion of the sealant (while the sealant is wet or uncured) into a fillet or curved surface. Other sealing methods are possible as well.

Figure 4C:
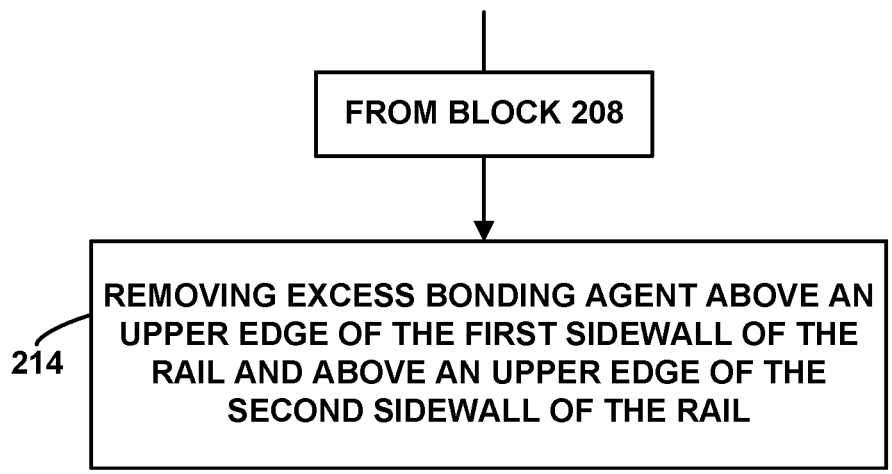
FIG. 4C is a flowchart of a method, which is a continuation of the method for bonding a structural component to a rail using the systems of FIGS. 1 to 3B shown in FIG. 4A.

In one example, the bonding agent 103 is injected into the channel 112 prior to positioning the structural component 102 at least partially into the channel 112 such that the structural component 102 rests on each spacer 116. In such an example, as shown in FIG. 4C, at block 214 the method 200 may further include removing excess bonding agent 103 above an upper edge of the first sidewall 108 of the rail 104 and above an upper edge of the second sidewall 110 of the rail 104.

In another example, the step of injecting the bonding agent 103 into the channel 112 includes injecting the bonding agent 103 into the second gap 146 between the structural component 102 and the first sidewall 108 of the rail 104, and injecting the bonding agent 103 into the third gap 148 between the structural component 102 and the second sidewall 110 of the rail 104.

Figure 4D:
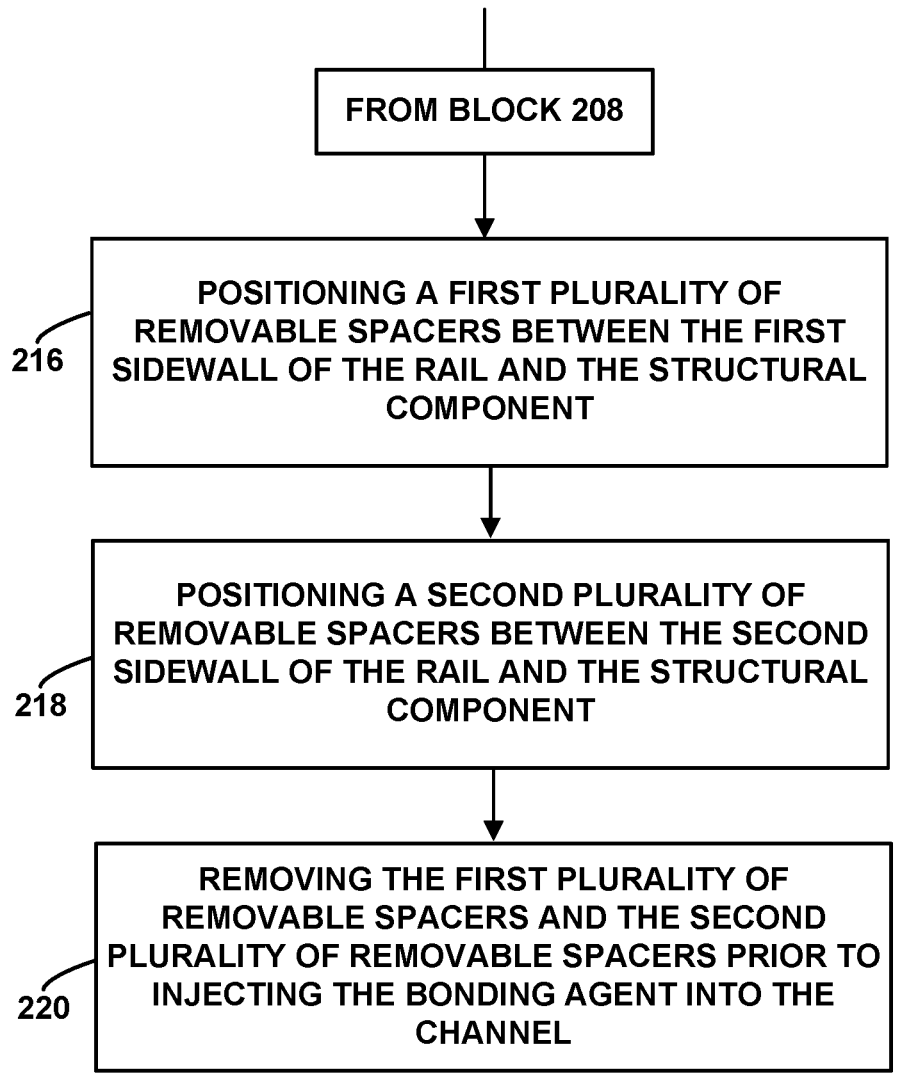
FIG. 4D is a flowchart of a method, which is a continuation of the method for bonding a structural component to a rail using the systems of FIGS. 1 to 3B shown in FIG. 4A.

In another example, as shown in FIG. 4D, at block 216 the method 200 further includes positioning a first plurality of removable spacers 150 between the first sidewall 108 of the rail 104 and the structural component 102. At block 218, the method 200 further includes positioning a second plurality of removable spacers 152 between the second sidewall 110 of the rail 104 and the structural component 102. At block 220, the method 200 further includes removing the first plurality of removable spacers 150 and the second plurality of removable spacers 152 prior to injecting the bonding agent 103 into the channel 112. As discussed above, the first plurality of removable spacers 150 and the second plurality of removable spacers 152 may help center the structural component 102 between the first sidewall 108 and the second sidewall 110 of the rail 104 before the bonding agent 103 is injected into the channel 112.

Figure 4E:
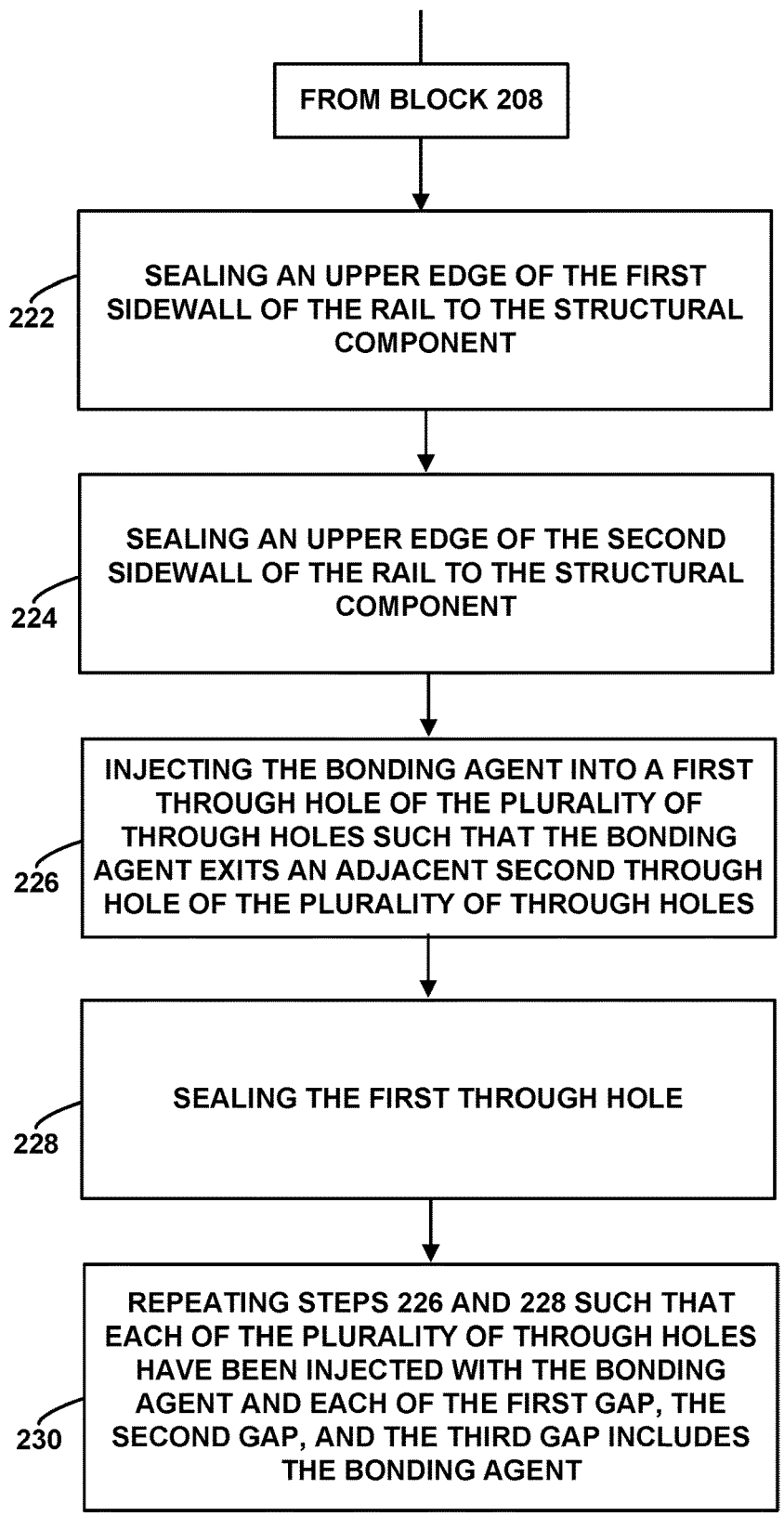
FIG. 4E is a flowchart of a method, which is a continuation of the method for bonding a structural component to a rail using the systems of FIGS. 1 to 3B shown in FIG. 4A.

In one example, the bottom surface 106 of the rail 104 includes a plurality of through holes 132. In such an example, as shown in FIG. 4E, at block 222 the method 200 further includes sealing an upper edge of the first sidewall 108 of the rail 104 to the structural component 102. At block 224, the method 200 further includes sealing an upper edge of the second sidewall 110 of the rail 104 to the structural component 102. At block 226, the method 200 further includes injecting the bonding agent 103 into a first through hole of the plurality of through holes 132 such that the bonding agent 103 exits an adjacent second through hole of the plurality of through holes 132. At block 228, the method 200 further includes sealing the first through hole. At block 230, the method 200 further includes repeating the steps from blocks 226 and 228 such that each of the plurality of through holes 132 have been injected with the bonding agent 103 and each of the first gap 144, the second gap 146, and the third gap 148 includes the bonding agent 103. The plurality of through holes 132 may be interspaced evenly between the plurality of blind holes 114 on the bottom surface 106 of the rail 104.

Figure 4F:
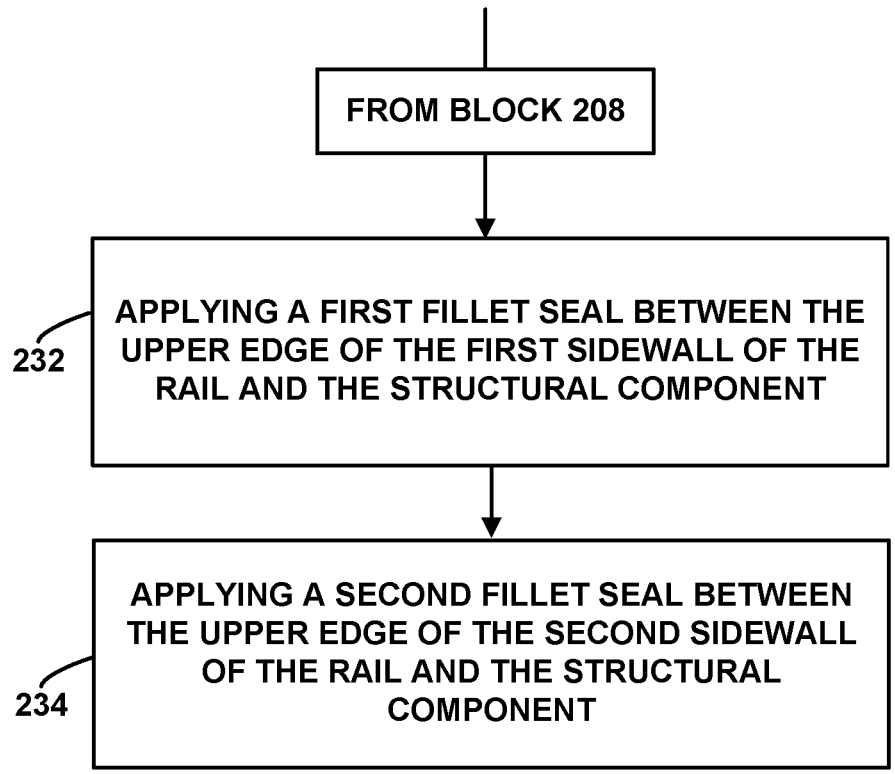
FIG. 4F is a flowchart of a method, which is a continuation of the method for bonding a structural component to a rail using the systems of FIGS. 1 to 3B shown in FIG. 4A.

In one particular example, sealing the upper edge of the first sidewall 108 of the rail 104 to the structural component 102 comprises applying a first dam seal between the upper edge of the first sidewall 108 of the rail 104 and the structural component 102, and sealing an upper edge of the second sidewall 110 of the rail 104 to the structural component 102 comprises applying a second dam seal between the upper edge of the second sidewall 110 of the rail 104 and the structural component 102. In another example, as shown in FIG. 4F, at block 232 the method 200 further includes applying a first fillet seal between the upper edge of the first sidewall 108 of the rail 104 and the structural component 102. At block 234, the method 200 further includes applying a second fillet seal between the upper edge of the second sidewall 110 of the rail 104 and the structural component 102.

Figure 5A:
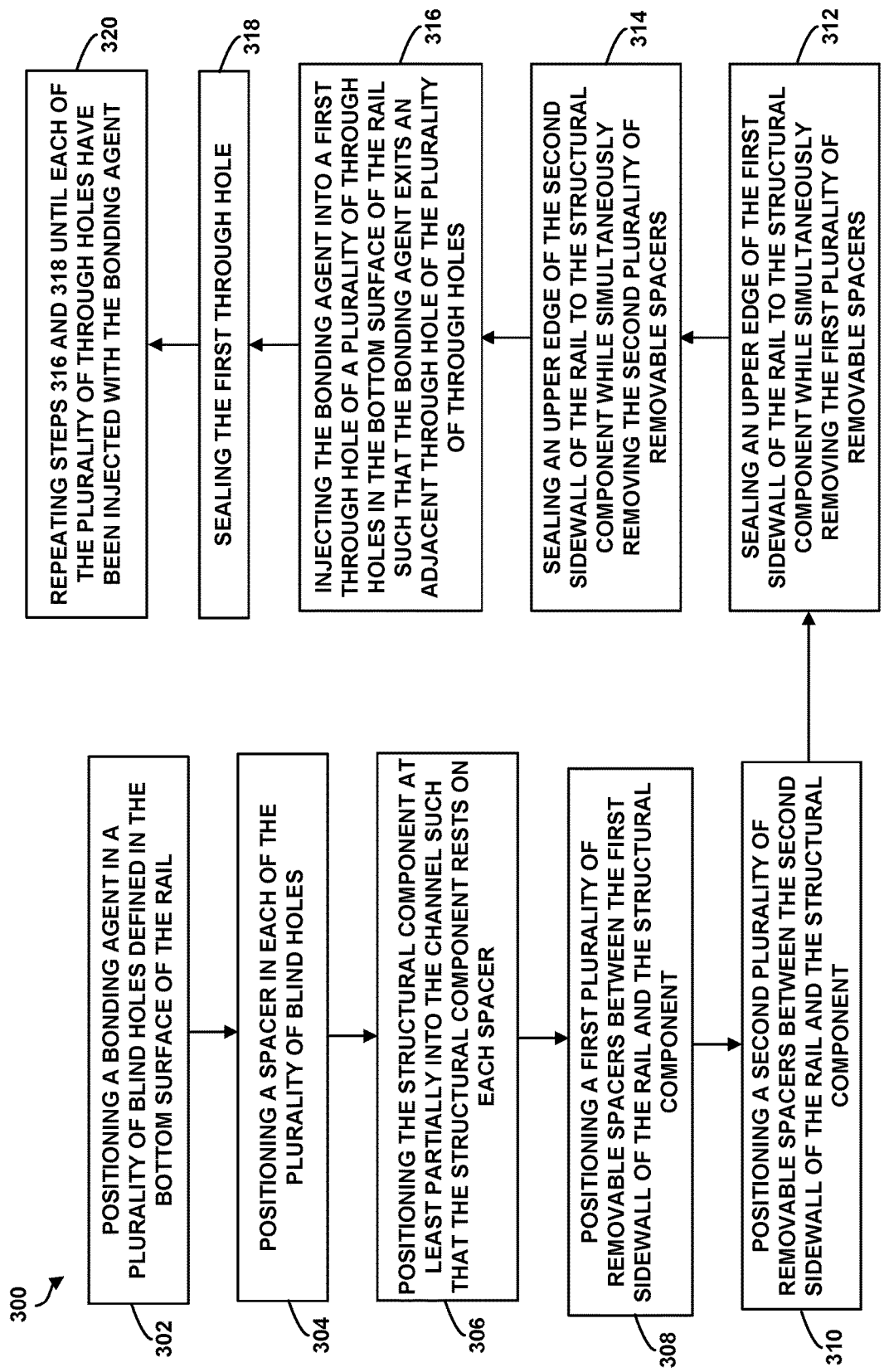
FIG. 5A is a flowchart of another example method for bonding a structural component to a rail using the systems of FIGS. 1 to 3B.

FIG. 5A is a block diagram of another example method for bonding a structural component 102 to a rail 104. As discussed above, the rail 104 includes a bottom surface 106, a first sidewall 108 extending from the bottom surface 106, and a second sidewall 110 extending from the bottom surface 106 to thereby define a channel 112. Method 300 shown in FIG. 5A presents an example of a method that could be used to assemble the system 100 discussed above in relation to FIGS. 1-3B, as an example. Method 300 includes one or more operations, functions, or actions as illustrated by one or more of blocks 302-320. In one example, an aircraft component supplier can manufacture or deliver the structural component 102 and/or the rail 104 to an end user such as an aircraft manufacturer. The aircraft manufacturer could then perform the actions recited in blocks 302-320 below. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Initially, at block 302, the method 300 includes positioning a bonding agent 103 in a plurality of blind holes 114 defined in the bottom surface 106 of the rail 104. At block 304, the method 300 includes positioning a spacer 116 in each of the plurality of blind holes 114, where each spacer has a stem 118 and a top portion 120 extending substantially perpendicular to the stem 118, and where the stem 118 of the spacer 116 is positioned in each of the plurality of blind holes 114 such that a longitudinal axis of the top portion 120 of each spacer 116 is parallel to a longitudinal axis of the channel 112. At block 306, the method 300 includes positioning the structural component 102 at least partially into the channel 112 such that the structural component 102 rests on each spacer 116, where a first gap 144 is defined between the structural component 102 and the bottom surface 106 of the rail 104, a second gap 146 is defined between the structural component 102 and the first sidewall 108 of the rail 104, and a third gap 148 is defined between the structural component 102 and the second sidewall 110 of the rail 104.

At block 308, the method 300 further includes positioning a first plurality of removable spacers 150 between the first sidewall 108 of the rail 104 and the structural component 102. At block 310, the method 300 further includes positioning a second plurality of removable spacers 152 between the second sidewall 110 of the rail 104 and the structural component 102. At block 312, the method 300 further includes sealing an upper edge of the first sidewall 108 of the rail 104 to the structural component 102 while simultaneously removing the first plurality of removable spacers 150. At block 314, the method 300 further includes sealing an upper edge of the second sidewall 110 of the rail 104 to the structural component 102 while simultaneously removing the second plurality of removable spacers 152. As discussed above, the previous two steps (312-314) may comprise a dam seal or other type of seal to create a closed cavity in the channel 112.

At block 316, the method 300 further includes injecting the bonding agent 103 into a first through hole of a plurality of through holes 132 in the bottom surface 106 of the rail 104 such that the bonding agent 103 exits an adjacent through hole of the plurality of through holes 132. At block 318, the method 300 includes sealing the first through hole. At block 320, the method 300 includes repeating the previous two steps (316-318) such that each of the plurality of through holes 132 have been injected with the bonding agent 103 and each of the first gap 144, the second gap 146, and the third gap 148 includes the bonding agent 103 to thereby bond the structural component 102 to the rail 104.

Figure 5B:
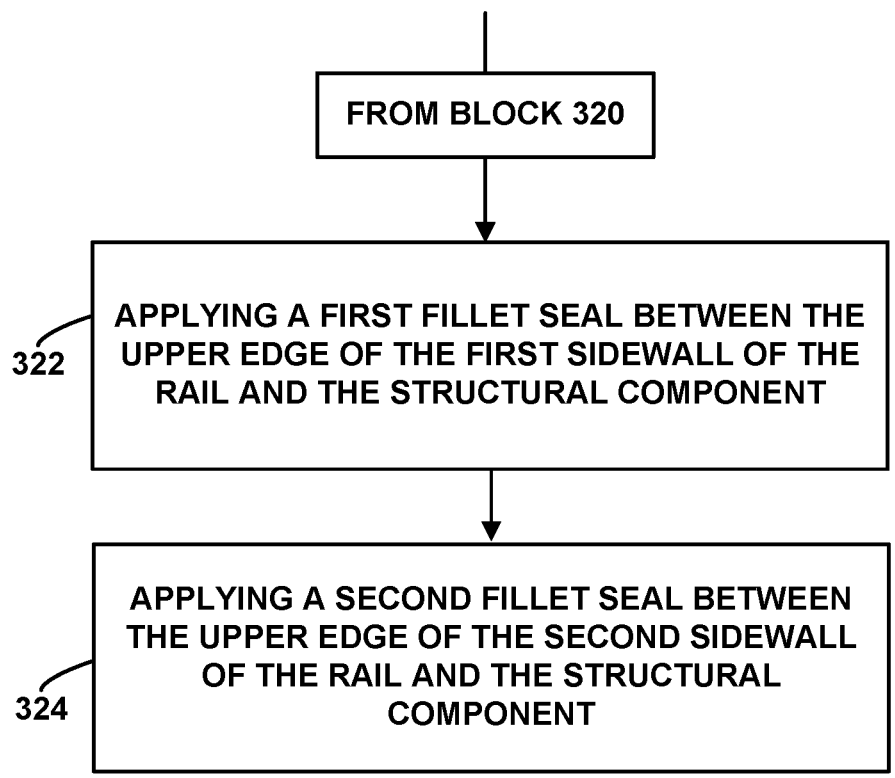
FIG. 5B is a flowchart of a method, which is a continuation of the method for bonding a structural component to a rail using the systems of FIGS. 1 to 3B shown in FIG. 5A.

In one example, as shown in FIG. 5B, at block 322 the method 300 further includes applying a first fillet seal between the upper edge of the first sidewall 108 of the rail 104 and the structural component 102. At block 324, the method 300 may further include applying a second fillet seal between the upper edge of the second sidewall 110 of the rail 104 and the structural component 102.

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts were described in conjunction with specific examples, it will be understood that these examples are not intended to be limiting.

In FIGS. 4A-5B, referred to above, the blocks may represent operations and/or portions thereof and lines connecting the various blocks do not imply any particular order or dependency of the operations or portions thereof. It will be understood that not all dependencies among the various disclosed operations are necessarily represented. FIGS. 4A-5B and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" and "substantially" each means +/−5%.

As used herein, a "blind hole" is a hole that is recessed in a surface but does not extend through that surface.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system (100) for an aircraft, the system (100) comprising:
   a rail (104), comprising:
      a bottom surface (106),
      a first sidewall (108), extending from the bottom surface (106), and
      a second sidewall (110), extending from the bottom surface (106), wherein the first sidewall (108), the second sidewall (110), and the bottom surface (106)

define a channel (112), and wherein the rail (104) further comprises blind holes (114), located in the bottom surface (106);

spacers (116), each comprising a stem (118) and a top portion (120), extending substantially perpendicular to the stem (118), wherein the stem (118) of each of the spacers (116) is configured to be positioned in a respective one of the blind holes (114) such that a longitudinal axis of the top portion (120) of each of the spacers (116) is parallel to a longitudinal axis of the channel (112); and a structural component (102), a portion of which is configured to be positioned into the channel (112) such that the structural component (102) rests on the top portion (120) of each of the spacers (116).

2. The system (100) of claim 1, wherein:
each of the spacers (116) further comprises a first material, and
the structural component (102) comprises a second material that is harder than the first material.

3. The system (100) of claim 1, wherein:
the top portion (120) of each of the spacers (116) comprises:
a top surface (124), facing in a first direction,
a bottom surface (126), facing in a second direction, which is opposite to the first direction,
a first side surface (128), facing in a third direction, wherein the third direction is different from the first direction and the second direction, and
a second side surface (130), facing in a fourth direction, which is opposite to the third direction, and
each of the top surface (124) of the top portion (120), the bottom surface (126) of the top portion (120), the first side surface (128) of the top portion (120), and the second side surface (130) of the top portion (120) is flat.

4. The system (100) of claim 1, wherein the rail (104) further comprises through holes (132), interspaced between the blind holes (114) on the bottom surface (106).

5. The system (100) of claim 1, wherein:
the stem (118) of each of the spacers (116) comprises:
a first side (134), facing in a first direction
a second side (136), facing in a second direction, which is opposite to the first direction,
a third side (138), facing in a third direction, wherein the third direction is different from the first direction and the second direction, and
a fourth side (140), facing in a fourth direction, which is opposite to the third direction,
the first side (134) and the second side (136) are flat and are parallel to the longitudinal axis of the channel (112), and
the third side (138) and the fourth side (140) have a radius of curvature (142), corresponding to a diameter (115) of each of the blind holes (114).

6. The system (100) of claim 1, further comprising:
a first plurality of removable spacers (150), configured to be removably positioned between the first sidewall (108) of the rail (104) and the structural component (102); and
a second plurality of removable spacers (152), configured to be removably positioned between the second sidewall (110) of the rail (104) and the structural component (102).

7. The system (100) of claim 1, wherein:
the structural component (102) comprises an aircraft canopy, and
the rail (104) is a canopy rail.

8. The system (100) of claim 1, wherein at least a portion of the structural component (102) is configured to be positioned into the channel (112) such that the structural component (102) rests on the top portion (120) of each of the spacers (116) and further such that:
a first gap (144) is located between the structural component (102) and the bottom surface (106) of the rail (104),
a second gap (146) is located between the structural component (102) and the first sidewall (108) of the rail (104), and
a third gap (148) is located between the structural component (102) and the second sidewall (110) of the rail (104).

9. The system (100) of claim 1, wherein:
an upper edge of the first sidewall (108) of the rail (104) is sealed to the structural component (102), and
an upper edge of the second sidewall (110) of the rail (104) is sealed to the structural component (102).

10. The system (100) of claim 9, wherein:
the upper edge of the first sidewall (108) of the rail (104) is sealed to the structural component (102) with a first fillet seal, and
the upper edge of the second sidewall (110) of the rail (104) is sealed to the structural component (102) with a second fillet seal.

11. The system (100) of claim 1, wherein each of the spacers (116) is positioned such that the longitudinal axis of the top portion (120) of each of the spacers (116) is positioned in a flow direction of a bonding agent (103) when the bonding agent (103) is injected into the channel (112).

12. A system (100) for an aircraft, the system (100) comprising:
a rail (104) comprising a bottom surface (106), a first sidewall (108) extending from the bottom surface (106), and a second sidewall (110) extending from the bottom surface (106), wherein the first sidewall (108), the second sidewall (110), and the bottom surface (106) define a channel (112), and wherein the rail (104) further comprises blind holes (114), located in the bottom surface (106);

spacers (116), each having a stem (118) and a top portion (120), extending substantially perpendicular to the stem (118), wherein the stem (118) of each of the spacers (116) is configured to be positioned in a respective one of the blind holes (114) such that a longitudinal axis of the top portion (120) of each of the spacers (116) is parallel to a longitudinal axis of the channel (112);

a structural component (102), a portion of which is configured to be positioned into the channel (112) such that the structural component (102) rests on the top portion (120) of each of the spacers (116);

a first plurality of removable spacers (150), configured to be removably positioned between the first sidewall (108) of the rail (104) and the structural component (102); and a second plurality of removable spacers (152), configured to be removably positioned between the second sidewall (110) of the rail (104) and the structural component (102).

13. The system (100) of claim 12, wherein:
each of the spacers (116) comprises a first material, and
the structural component (102) comprises a second material that is harder than the first material.

14. The system (100) of claim 12, wherein:
the top portion (120) of each of the spacers (116) comprises:
- a top surface (124), facing in a first direction,
- a bottom surface (126), facing in a second direction, which is opposite to the first direction,
- a first side surface (128), facing in a third direction, wherein the third direction is different from the first direction and the second direction, and
- a second side surface (130), facing in a fourth direction, which is opposite to the third direction, and each of the top surface (124) of the top portion (120), the bottom surface (126) of the top portion (120), the first side surface (128) of the top portion (120), and the second side surface (130) of the top portion (120) is flat.

15. The system (100) of claim 12, wherein the bottom surface (106) of the rail (104) further comprises through holes (132), interspaced between the blind holes (114) on the bottom surface (106) of the rail (104).

16. The system (100) of claim 12, wherein:
the stem (118) of each of the spacers (116) comprises:
- a first side (134), facing in a first direction
- a second side (136), facing in a second direction, which is opposite to the first direction,
- a third side (138), facing in a third direction, wherein the third direction is different from the first direction and the second direction, and
- a fourth side (140), facing in a fourth direction, which is opposite to the third direction, the first side (134) and the second side (136) are flat and are parallel to the longitudinal axis of the channel (112), and the third side (138) and the fourth side (140) have a radius of curvature (142), corresponding to a diameter (115) of each of the blind holes (114).

17. The system (100) of claim 12, wherein:
the structural component (102) comprises an aircraft canopy, and
the rail (104) is a canopy rail.

18. The system (100) of claim 12, wherein at least a portion of the structural component (102) is configured to be positioned into the channel (112) such that the structural component (102) rests on the top portion (120) of each of the spacers (116) and further such that:
- a first gap (144) is located between the structural component (102) and the bottom surface (106) of the rail (104),
- a second gap (146) is located between the structural component (102) and the first sidewall (108) of the rail (104), and
- a third gap (148) is located between the structural component (102) and the second sidewall (110) of the rail (104).

19. The system (100) of claim 12, wherein:
an upper edge of the first sidewall (108) of the rail (104) is sealed to the structural component (102), and
an upper edge of the second sidewall (110) of the rail (104) is sealed to the structural component (102).

20. The system (100) of claim 19, wherein:
the upper edge of the first sidewall (108) of the rail (104) is sealed to the structural component (102) with a first fillet seal, and
the upper edge of the second sidewall (110) of the rail (104) is sealed to the structural component (102) with a second fillet seal.

* * * * *